Figure 1:
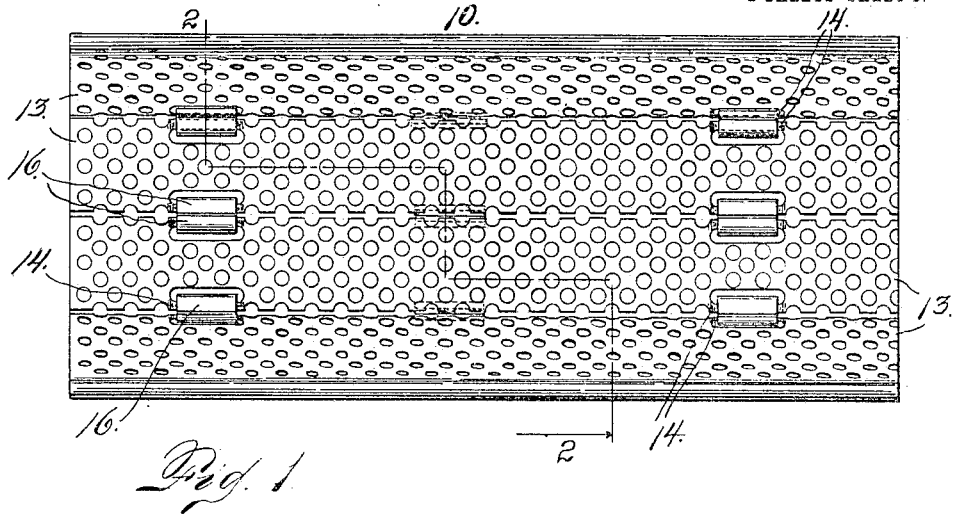

R. McVICAR.
AUTOMATIC DRIVING BOX LUBRICATOR.
APPLICATION FILED APR. 14, 1914.

1,117,881.

Patented Nov. 17, 1914.
2 SHEETS—SHEET 1.

Witnesses
Otto E. Haddick
L. E. Petersen

Inventor
Robert McVicar
By A. J. O'Brien
Attorney

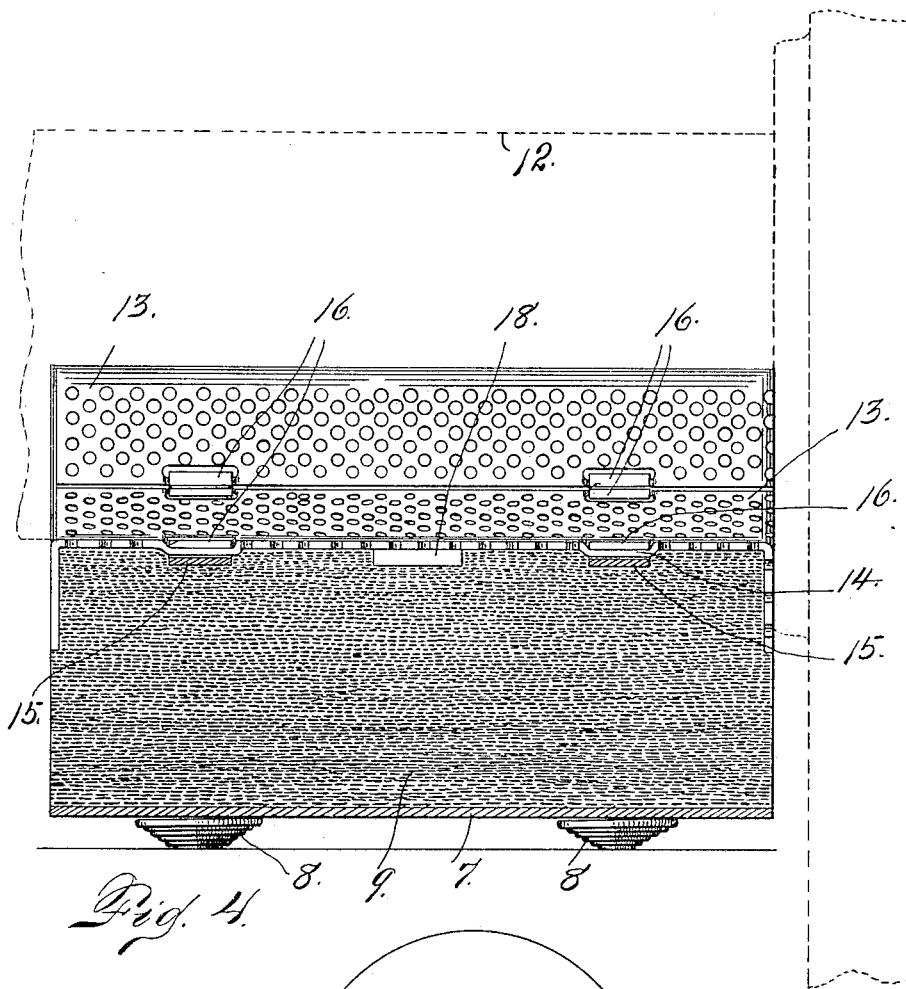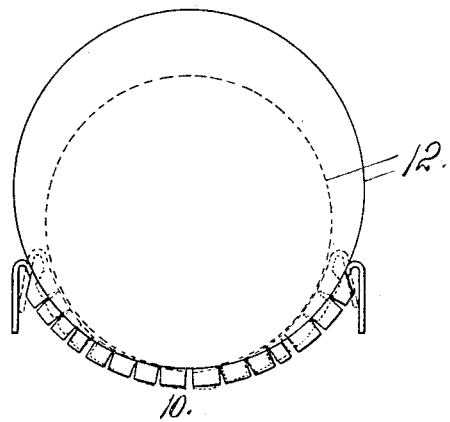

UNITED STATES PATENT OFFICE.

ROBERT McVICAR, OF ST. PAUL, MINNESOTA.

AUTOMATIC DRIVING-BOX LUBRICATOR.

1,117,881. Specification of Letters Patent. Patented Nov. 17, 1914.

Application filed April 14, 1914. Serial No. 831,867.

*To all whom it may concern:*

Be it known that I, ROBERT McVICAR, citizen of the United States, residing at St. Paul, county of Ramsey and State of Minnesota, have invented certain new and useful Improvements in Automatic Driving-Box Lubricators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in automatic lubricators, more especially adapted for use in connection with the journal boxes of locomotive drive wheels. Lubricators of this character as heretofore constructed, are adapted for use in applying a cake of relatively hard lubricant to the journal of the locomotive drive wheel, through the medium of a follower which engages the bottom of the cake of lubricant and is in turn acted on by a spring under sufficient tension to force the follower and the cake of lubricant upwardly as fast as the lubricant is needed, in order to properly supply the journal. Above the cake of lubricant and arranged to conform to the curve of the journal, is a perforated or reticulated plate through which the lubricant passes in sufficient quantity to supply the journal, the lubricating material being melted as transmitted, resulting from the warmth developed in the journal incident to its use. Heretofore, so far as I am aware, this perforated plate has been formed from an integral piece of material and as a result, a single plate, in order to properly perform its function, can only be employed in connection with a journal of the same size, since, if an attempt is made to employ it with a larger or smaller journal, the desired result will not be obtained, as the plate, not properly conforming to the curve of the journal, cannot perform its function, and in order to obtain the best results, the plate must conform to the curve of the journal with which it is employed. Again, where a plate of this character is originally made to fit a given journal, the expansion and contraction incident to its use soon results in its becoming distorted or twisted, so to speak, out of shape to such an extent that it no longer conforms to the curve of the journal, and it necessarily fails in the proper performance of the function intended. This difficulty has been demonstrated by actual practice, and the result is that after these perforated plates have been used for some time, it is necessary that they should be removed and hammered into shape. This operation is exceedingly difficult and even when accomplished, does not produce entirely satisfactory results.

My object is to overcome this difficulty, and to this end I employ a jointed or articulated perforated plate. I prefer that the axes of the joints shall extend longitudinally of the plate or parallel with the axis of the journal to which it is applied, though this plate may be jointed both longitudinally and transversely if desired. As illustrated in the drawing, the jointing is longitudinal, though it may be transversely jointed either alone or in combination with the longitudinal jointing, should it be found necessary or desirable so to do.

Having briefly outlined my improved construction, I will proceed to describe the same in detail, reference being made to the accompanying drawing, in which is illustrated an embodiment thereof.

Figure 2:
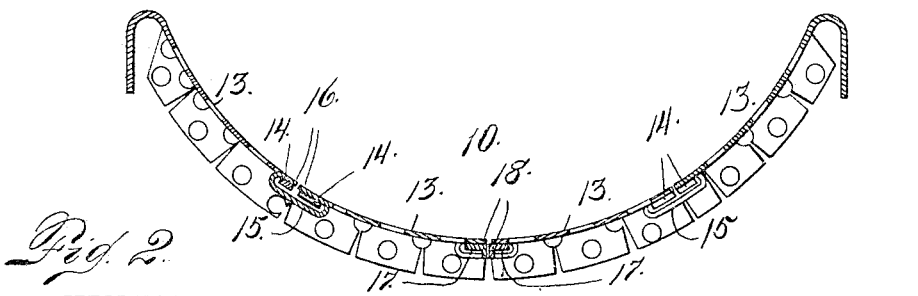
Figure 3:
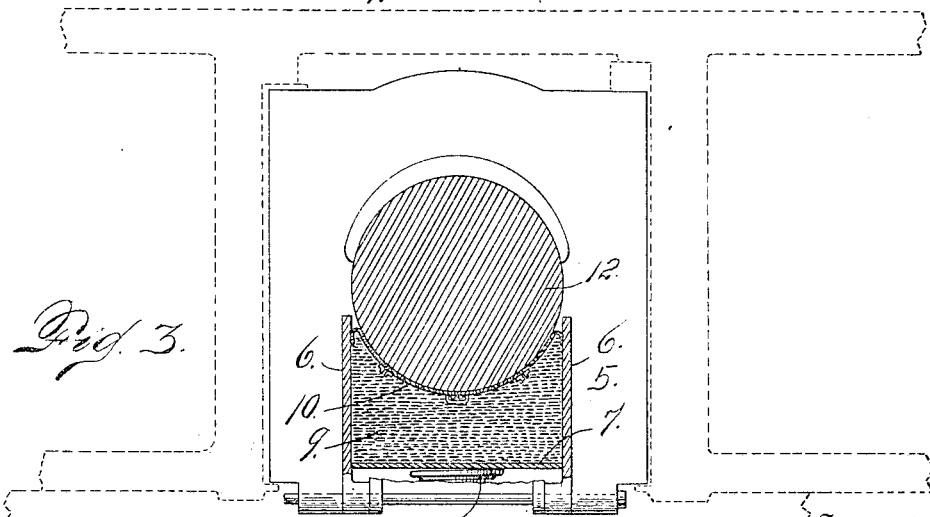

In this drawing, Figure 1 is a top plan view of my improved articulated perforated plate. Fig. 2 is a transverse section taken on the line 2—2, Fig. 1. Fig. 3 is a cross section taken through a journal and a lubricator equipped with my improvement, the lubricating material being shown in place and as initially applied, or when the cellar is practically full. This view is shown on a much smaller scale than Figs. 1 and 2. Fig. 4 is a longitudinal section taken through a lubricator equipped with my improvement, the journal being indicated by dotted lines. This view is on a smaller scale than Figs. 1 and 2, but on a larger scale than Fig. 3. Fig. 5 is an end elevation of a journal shown in connection with my improved reticulated plate, the parts being shown on a different scale from any of the other views.

The same reference characters indicate the same parts in all the views.

Let the numeral 5 designate the cellar of a journal box of a locomotive driver; 6 the side walls thereof; 7 the follower; 8 the spring acting on the follower from below; 9 the cake of relatively hard lubricant and 10 the perforated plate arranged above the cake of lubricant and in direct engagement with the lower portion of the journal 12. This perforated or reticulated plate, as illustrated in the drawing, is composed of four sections 13, of approximately equal area, the said sections being connected in any suitable manner to permit the necessary movement, to allow the plate to conform to the curve of journals of different diameters within a considerable range.

As illustrated in the drawing, a peculiar construction of hinge is employed. The adjacent edges of the sections 13 where the hinges are located, are pressed slightly outwardly as shown at 14, and small plates 15 are bent around the parts 14, forming a sort of loose clasp adapted to permit the connected parts 13 of the reticulated plate to move either inwardly or outwardly, within a considerable range, in order to adapt the device for use on journals of different sizes and varying within the necessary or desired range, as heretofore intimated. By virtue of this peculiar construction whereby the parts 14 are forced outwardly or depressed, as indicated in the drawing, it becomes practicable to cause the upper portions 16 of the hinge parts 15 to occupy positions flush with the inner face of the perforated plate. It is evident, however, that any other suitable construction for hinging or connecting the sections of the plate may be employed, and it must be understood that the invention is not in any way limited to the construction of hinge illustrated and described, or to any other specific construction for connecting the sections of the articulated device.

As illustrated in the drawing, the perforated plate is composed of four sections, the two edges of the adjacent sections in each instance being connected by two hinges. It is evident, however, that the number of hinges, as well as the construction of these hinges, may be varied as desired, or as circumstances or judgment may dictate. In this construction, it is important to prevent the over-lapping of the adjacent sections of the reticulated plate. The joints, however, are sufficiently loose, in the absence of some preventative, to permit such over-lapping. The reason for making the joints reasonably loose has been heretofore explained, namely, in order to give the plate the necessary range of movement to cause it to conform to the curve of journals of varying size within a considerable range. In order to prevent the over-lapping of the sections, the adjacent edges of the sections are each equipped with a small angle member 17. These members while preferably integral parts of the sections, may be brazed or otherwise suitably secured thereto. They are so arranged that the depending flanges 18 of these members will prevent the over-lapping of the plates, since each flange 18 is of sufficient length to engage the edge of the opposite section when the latter is moved either above or below the adjacent section as far as the hinge will permit, hence the sections cannot by any possibility, be moved to over-lap.

The necessity for employing a reticulated plate of such construction as to cause it to engage the journal in one or more lines extending the entire length of the journal, will be understood when it is explained that a lubricator of the character described or with which a hard lubricant must be used, would be absolutely useless were it not for the fact that the heat or warmth generated by the contact of the journal with the perforated plate is sufficient to melt or warm the normally hard lubricant and cause the same to flow or spread itself over the journal as the latter rotates. Hence, if the reticulated plate does not conform to the contour of the journal when applied, or has become distorted by repeated expansion and contraction due to the heating and cooling resulting from alternate use and disuse, so that there is not an uninterrupted line of contact between such plate and the journal over the entire contact surface of the latter, the lubricator will fall short of its purpose and its effectiveness is greatly reduced.

As heretofore intimated, the object of my present invention is to overcome the difficulty heretofore experienced in making the perforated plate a proper fit to the surface of the journal when first applied, and the further difficulty experienced in maintaining it a proper fit to the surface of the journal while in service, because of the distortion constantly occurring in it, incident to expansion and contraction due to the alternate heating and cooling of the device, in this class of lubricator. It is obvious that the articulated construction heretofore described will overcome these difficulties, since the flexibility in the surface of the perforated plate because of its being articulated, more readily permits the contact surface of the perforated plate to conform to the contour surface of the journal.

The sectional or articulated construction of the reticulated device will prevent to a large extent, the tendency to distortion due to the alternate heating and cooling of the plate, since the smaller the area of the sections, the less the tendency to distortion due to the result stated, and by employing, say, four sections as illustrated in the drawing, it is believed that the difficulty mentioned will be entirely overcome. Furthermore, my improved construction is, at the same time, adapted for use with journals of varying sizes within a considerable range, which feature in itself, is exceedingly important.

Having thus described my invention, what I claim is:—

1. A journal box lubricator including a perforated plate adapted to engage the journal, and composed of a number of sections hingedly connected for the purpose set forth.

2. The combination with a journal box cellar and a spring actuated follower therein, of a perforated plate composed of a number of jointed sections adapted to distribute the lubricant to the journal from a relatively hard cake of material located between the follower and the plate.

3. In a journal lubricator, the combination with a spring actuated follower arranged to act upon a cake of relatively hard lubricant to raise the latter toward the journal, of a perforated plate composed of a number of jointed sections located between the cake of lubricant and the journal.

4. In a journal lubricator, the combination with a spring actuated follower located in the cellar of a journal box, and adapted to act on a cake of relatively hard lubricant, of a reticulated plate composed of a number of jointed sections located between the cake of lubricant and the journal, the axes of the joints connecting the plate sections extending parallel with the axis of the journal.

5. An automatic driving box lubricator, including a perforated plate composed of a number of jointed sections, the axes of the joints extending parallel with the axis of the journal.

6. A journal box lubricator including a perforated plate adapted to engage the journal, and composed of a number of sections hingedly connected, and equipped with means to prevent over-lapping of the sections.

7. A journal box lubricator including a perforated plate adapted to engage the journal, and composed of a number of sections hingedly connected and provided with angle members to prevent over-lapping of the sections.

In testimony whereof I affix my signature in presence of two witnesses.

ROBERT McVICAR.

Witnesses:
MAZE KIRBY,
A. EBERT O'BRIEN.

Copies of this patent may be obtained for five cents each, by addressing the "Commissioner of Patents, Washington, D. C."